United States Patent

[11] 3,570,342

[72] Inventors Peter Mundt
Wankweg 9;
Arnold Neuhold, Archstrasse 23,
Garmisch-Partenkirchen, Germany
[21] Appl. No. 723,069
[22] Filed Apr. 22, 1968
[45] Patented Mar. 16, 1971
[32] Priority Apr. 27, 1967
[33] Germany
[31] G49946

[54] APPARATUS FOR SEVERING SLIDE FRAMES OR SLIDE FRAME HALVES AND FOR THREADING THEM ON HANDLING AND CENTERING RODS
6 Claims, 6 Drawing Figs.

[52] U.S. Cl. ....................................... 83/93,
83/95, 83/96, 83/444, 83/566, 83/914
[51] Int. Cl. ....................................... B26d 7/06
[50] Field of Search ......................... 83/89, 90,
93, 94, 95, 96, 91, 92, 444, 914, 566; 264/161,
157, 160; 18/5 (BS), 12 (TS); 271/(Inquired)

[56] References Cited
UNITED STATES PATENTS

| | | | |
|---|---|---|---|
| 1,597,793 | 8/1926 | Hopkins | 83/96 |
| 1,930,591 | 10/1933 | Fernald | 83/444X |
| 2,072,532 | 3/1937 | Roedels | 83/90 |
| 2,375,717 | 5/1945 | Winkel | 83/914X |
| 2,797,753 | 7/1957 | Bornemann | 83/89X |

*Primary Examiner*—Frank T. Yost
*Attorney*—Fleit, Gipple and Jacobson

ABSTRACT: In an automatic operation, slide frames or slide frame halves discharged from an injection molding machine are severed and threaded on handling and centering rods, by which the frames or frame halves can be fed in an ordered arrangement to a welding or mounting machine. A receiving hopper is disposed under the point where the frames or frame halves are ejected from the injection molding machine. A guideway leads from the hopper to a severing device, which is disposed on a lower level and into which the handling and centering rods can be inserted.

Fig. 2

Patented March 16, 1971 3,570,342

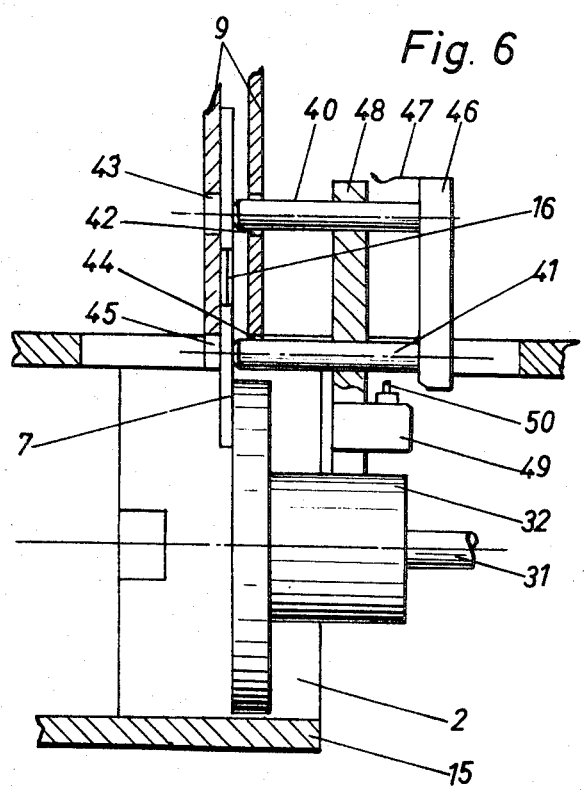

APPARATUS FOR SEVERING SLIDE FRAMES OR SLIDE FRAME HALVES AND FOR THREADING THEM ON HANDLING AND CENTERING RODS

This invention relates to an apparatus for automatically severing slide frames or slide frame halves made on an injection molding machine and for threading such frames or frame halves on handling and centering rods, by which the frames or frame halves can be fed in an ordered arrangement to a welding or mounting machine.

It has been desired for a long time to provide a slide frame which is made of plastics material and can displace the inexpensive cardboard slide frame from the market. This desire has not been fulfilled before for various reasons.

In the first place, the speed of the injection molding machine is restricted by the fact that the moldings are collected in random orientation in a container. For this reason, molded slide frames or halves thereof must be sufficiently cooled before they may be ejected from the mold. Nevertheless, a bending of the moldings in the collecting container is inevitable so that difficulties are involved in the subsequent assembling of the two frame halves. The sprue must also be removed from the moldings, which must then be threaded on handling and centering rods before they can receive a transparency in a mounting operation or are joined before such operation. These operations were previously carried out by hand and render the slide frame of plastics material noncompetitive compared to the inexpensive cardboard slide frames.

It is an object of the invention to provide an apparatus which enables an automatic performance of the operations which are carried out between the discharge of the moldings from the injection molding machine and the joining of the two frame halves.

In an apparatus of the kind described first hereinbefore, this object is accomplished according to the invention in that a receiving hopper is disposed under the point where the frames or frame halves are ejected from the injection molding machine and a guideway leads from said hopper to a severing device, which is disposed on a lower level and into which the handling and centering rods can be inserted. As the ejected frames or frame halves are no longer collected in a container in a random orientation but are orderly fed to a guideway, the cycle time of the injection molding machine can be reduced because the moldings connected by sprues cannot become deformed while travelling along a guideway. It will not be sufficient if the moldings cool down adequately in said guideway. A mutual bending of the individual moldings is also effectively avoided. Immediately after leaving the injection molding machine, the moldings are automatically severed from the sprue and orderly threaded on handling and centering rods, on which the moldings can be fed to a welding machine or a mounting machine. This depends on whether the mounting operation is to be performed before or after the two frame halves have been joined.

In a development of the invention, the severing device comprises a housing, by which the frames or frame halves connected by a sprue are guided and enclosed on the outside, and which contains guide bars that are disposed on one side of a wall aperture leading to the guideway and correspond to the distance between adjacent side edges of adjacent inserted frames or frame halves, a severing knife disposed between said bars, and a pusher for feeding the frames or frame halves, which pusher is disposed on the other side of the aperture and movable in the axial direction of the housing. In a preferred embodiment, the severing knife is circular and the feed pusher consists of a hollow cylinder which has an inside diameter exceeding the outside diameter of the severing knife and in its rear lower portion an outlet opening for the severed sprue, and a pressure ram, which rests on the forward part of the hollow cylinder and comprises plates which correspond to the individual frame halves and have apertures which correspond to the guide bars. The severing device is preferably hydraulically operated. When the frame or frame halves connected by a sprue enter from the guideway into the severing device and have been slightly pushed forwardly by the feed pusher, the frame or frame halves are centered on the outside by the housing of the severing device and inside said housing by the guide bars. When the frames or frame halves have been centered, the feed pusher moves the frames or frame halves onto the severing knife, by which the sprue is cut off. The sprues are connected inside the hollow cylinder and can leave it through the aperture in the rear lower portion of the cylinder. As the frame halves are exactly centered in the housing of the severing device with the aid of the guide bars, one end of the handling and centering rods can simply be inserted through the open forward wall of the housing into the picture aperture of the frames or frame halves.

To enable an automatic performance of the operations which are required between the discharge from the injection molding machine and the joining of the two frame halves, safety devices must be provided at all critical points of the automatic procedure unless the advantage afforded by the automatic operation may be offset by the time needed to remove defects. The safety devices according to the invention ensure that the injection molding machine and/or the severing device will be automatically shut down and an audible or visual signal will be generated as soon as a defect occurs at any of the critical points.

According to the invention, a safety device is disposed at the guideway and has a feeler wire which extends into the path in which the frames or frame halves are guided and upon contact with the wire or frames or frame halves operates a limit switch to initiate the following molding cycle of the machine. As a result, the next molding cycle cannot be initiated until the previously molded frames or frame halves have moved in the guideway past the feeler wire. This arrangement eliminates the most inconvenient defect, which resides in that a molding sticks to the mold when the same is opened and damages the mold when the same is subsequently closed for the next molding cycle.

The invention provides also a safety device which is disposed before the severing device and consists of two check rods, which are connected at their rear ends to a connecting plate, which is detachably connected by a spring to a guide plate, which is secured to the hollow cylinder of the feed pusher, said connecting plate depressing in said position a feeler pin carried by the guide rod, and two apertures formed in the guideway between the machine and the severing device and registering with the check rods. When the frames or frame halves connected by a sprue have not completely moved into the housing of the severing device, they cover the two apertures formed in the guideway and in register with the two check rods. When the latter engage the frames or frame halves, the feeler pin on the guide plate secured to the hollow cylinder of the feed pusher will move ahead to some extent so that the spring connection between the guide plate and the connecting plate between the two check rods will be eliminated and the feeler pin will be released. At this time, the drive for the severing device is stopped before the feed pusher has reached the aperture leading to the guideway.

Finally, a safety device arranged at the free ends of the handling and centering rods is secured to a mounting means for these free ends of the handling and centering rods and actuated by the frames or frame halves on the rods as soon as a predetermined number of frames or frame halves have been threaded on said rods. As soon as the maximum number of frames or frame halves have been threaded on the handling and centering rods, the safety device stops the injection molding machine and, in dependence on the latter, the severing device.

A visual or audible signal is generated when one of the three safety devices responds. Hence, the injection molding machine and the accessory according to the present invention can operate without constant supervision. Only when a signal has been generated must the operator find out whether there is a defect in the injection molding machine or the severing device or whether it is sufficient to replace the handling and centering rods by empty ones.

An embodiment of the invention will be explained hereinafter by way of example with reference to the drawing, in which:

FIG. 6 shows said safety device in the case of a disturbance.

Figure 1:
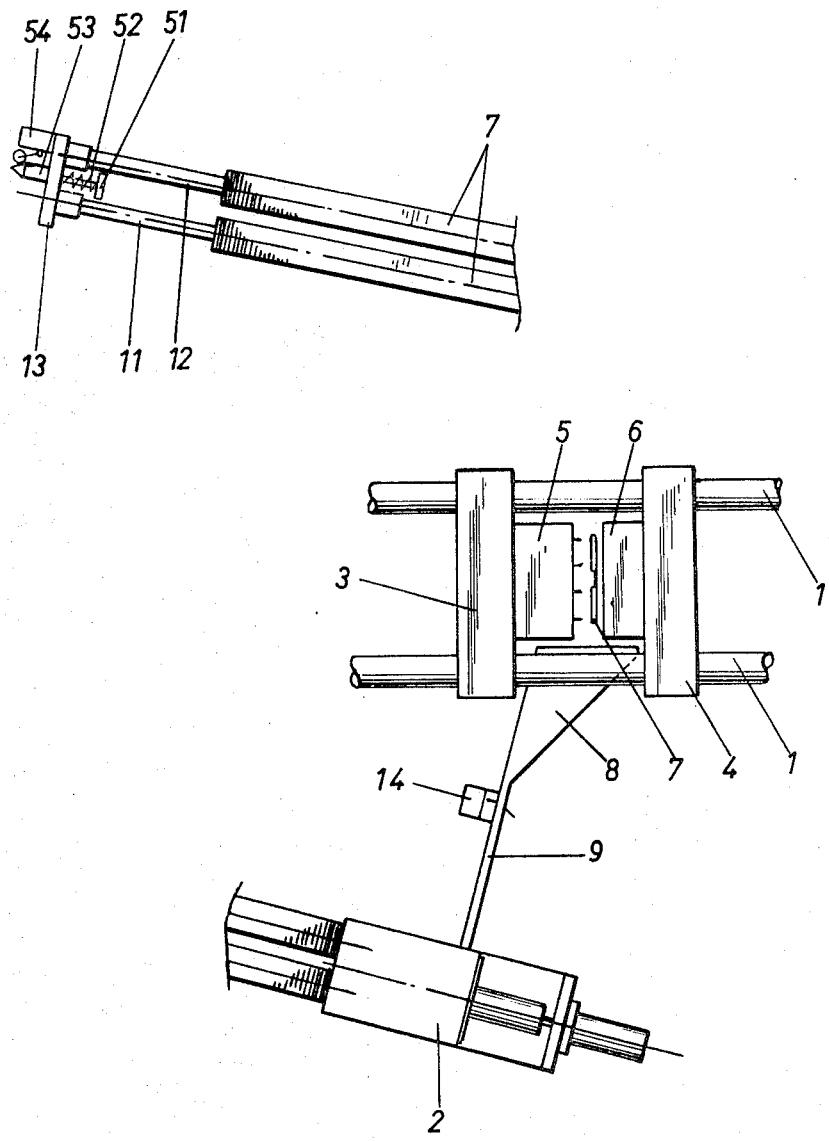
FIG. 1 is a diagrammatic view showing the apparatus according to the invention.

In FIG. 1, the injection molding machine is indicated by the two crossbars 1, the die plates 3, 4 and the mold halves 5, 6. The two mold halves 5, 6 have just been opened and the molding 7 has just been ejected and is about to drop into the hopper 8, which is disposed underneath. A guideway 9 leads from the hopper 8 to a severing device 2, which is disposed on a lower level. Handling and centering rods such as 11, 12 are inserted into the severing device 2 and are secured at the other end in a mounting 13. A number of moldings consisting of slide frame halves 7 are threaded on the handling and centering rods. A safety device 14 is disposed on the guideway 9.

Figure 2:
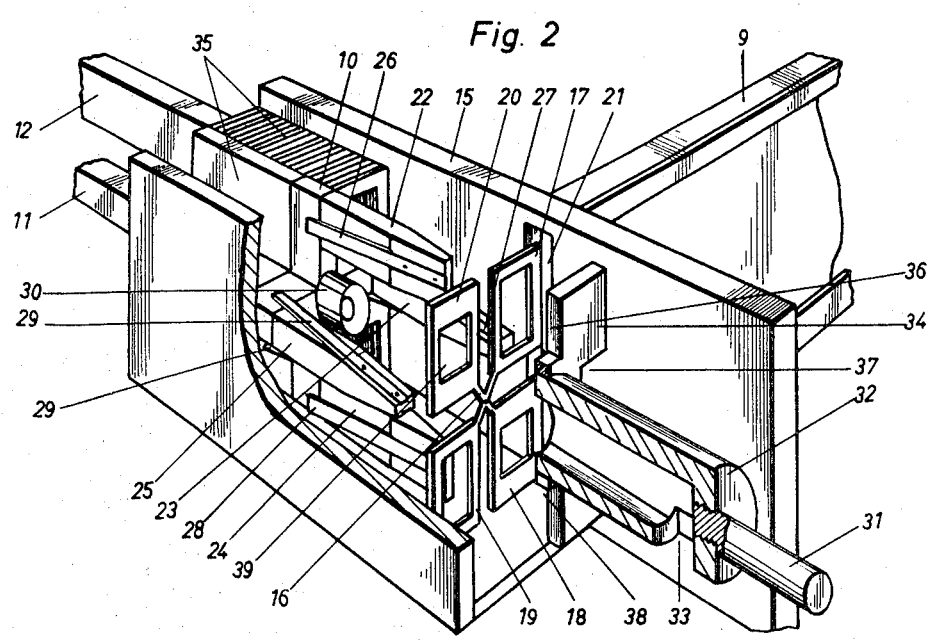
FIG. 2 is a perspective view showing the severing device.

The design of the severing device 2 is specifically shown in FIG. 2. In the illustrated embodiment, the safety device consists of a right-angled housing 15, by which the four frame halves 17—20, which are connected by a star-shaped sprue, are enclosed on the outside. The wall of the housing 15 which faces the guideway 9 has an aperture 21, through which the frame halves 17—20 have moved from the guideway 9 into the housing 15 of the severing device 2. As is best apparent from FIGS. 3 and 4, the inside space of the severing device tapers from the aperture 21 in the feeding direction so that the frame halves 17—20 are soon guided by the inside walls of the housing 15.

Centering bars 22—25 are arranged inside the housing 15 on the star plate 10 and correspond to the distance between adjacent side edges of adjacent inserted frame halves 20, 17 or 17, 18 or 18, 19 or 19, 20. The centering bars have beveled forward portions and are provided with pressure springs 26—29. A circular severing knife 30 is disposed between the centering bars 22—25.

Inside the housing 15, a pusher 31 is disposed on the other side of the aperture 21 and is movable in the axial direction of the housing to feed the frame halves 17—20. The feed pusher 31 is preferably hydraulically driven and consists of a hollow cylinder 32, the inside diameter of which exceeds the outside diameter of the severing knife 30. An outlet opening 33 for the severed sprue 16 is provided in the rear lower portion of the hollow cylinder 32. A pressure plate 34 resting on the forward portion of the hollow cylinder 32 conforms to the individual frame halves 17—20 and has apertures corresponding to the centering bars 22—25. FIG. 2 shows one-half of the pressure plate 34 with the apertures 36, 37, 38 for the centering bars 22, 23, 24.

Figure 3:
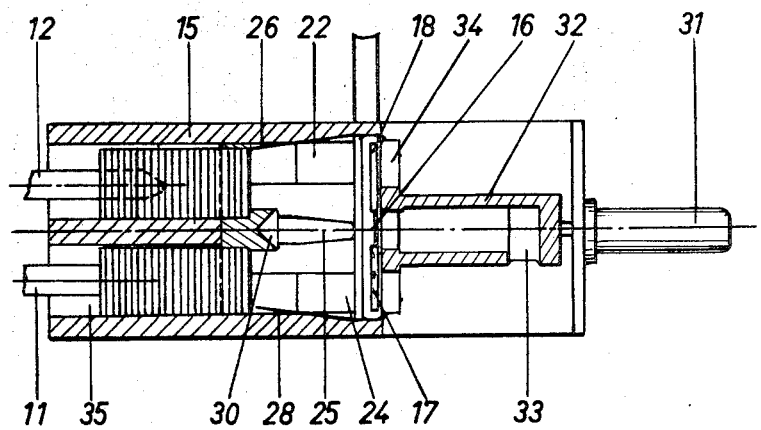
FIG. 3 is a sectional view showing the severing device with the feed pusher in its initial position.
Figure 4:
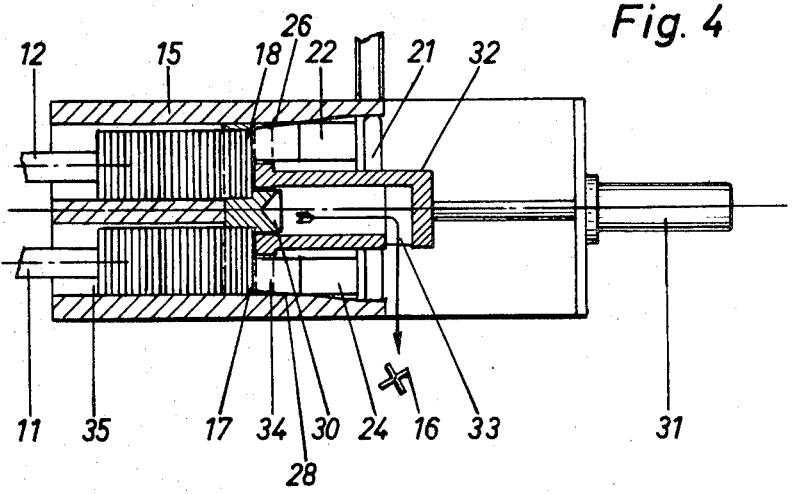
FIG. 4 is a similar sectional view showing the feed pusher in its end position after the cutting operation.

The severing device is shown in its initial position in FIG. 3 and in its end position in FIG. 4. When the feed pusher is being hydraulically moved in the axial direction of the housing 15, the plate 34 of the feed pusher pushes the frame halves 17—20 between the centering bars 22, 23, 24, 25 so that these are centered not only from the outside by the housing 15 but also from the inside by the centering bars 22, 23, 24, 25. When the frame halves 17—20 have thus been centered, they are pushed onto the severing knife 30, which enters the hollow cylinder 32 and severs the sprue 16. The latter falls then out through the outlet opening 33, as is apparent from FIG. 4. The same working stroke causes a stacking of the severed frame halves on the handling and centering rods such as 11, 12 in the stacking space 35 behind the severing knife 30. Because the frame halves 17—20 are perfectly centered and held upright by the pressure springs 26—29 and are thus prevented from falling back into the centering space, the handling and centering rods 11, 12 can simply be pushed into the picture apertures 39 of the frame halves and will be held in such position. A new severing and stacking operation can begin when the feed pusher 31 has been retracted.

Figure 5:
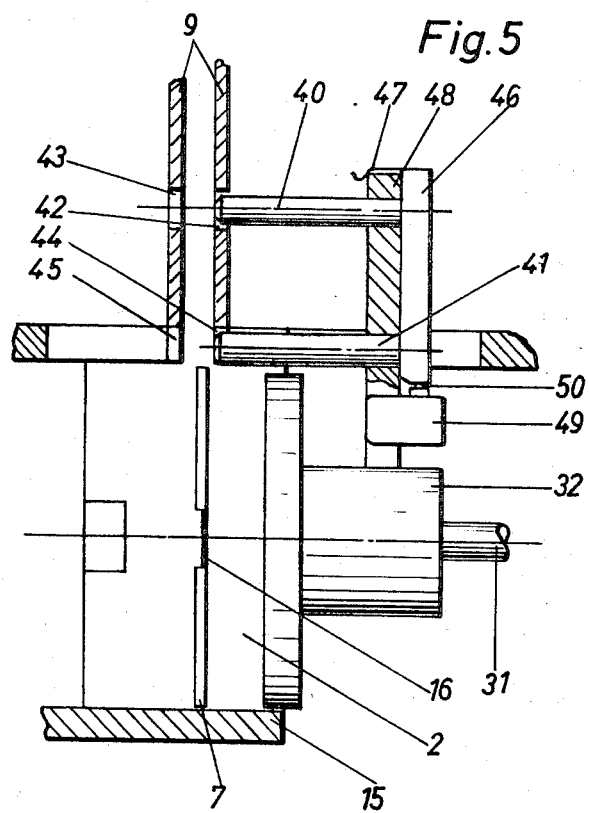
FIG. 5 shows the safety device at the severing device during normal operation.

The safety device which preceded the severing device 2 and is shown in FIGS. 5 and 6 consists of two check rods 40, 41 and of corresponding apertures 42, 43, 44 and 45 in the guideway 9. The check rods 40, 41 are connected at their rear end to a connecting plate 46, which is detachably connected by a detent spring 47 to a guide plate 48. The latter is secured to the hollow cylinder 32 of the feed pusher 31. A limit switch 49 is secured to the guide plate 48 and carries a feller pin 50, which is depressed when the detent spring 47 firmly connects the connecting plate 46 to the guide plate 48. In the condition shown in FIG. 5, the molding 7 which consists of the frame halves 17—20 and is connected by the sprue 16 has properly moved into the housing 15 of the severing device so that the movement of the check rods 40, 41 through the apertures 42—45 of the guideway 9 in response to a movement of the feed pusher 31 to the left in the plane of the drawing is not obstructed. In this phase, the feeler pin 50 is depressed by the connecting plate 46 and the severing device 2 operates normally.

In the condition shown in FIG. 6, the molding 7 has been caught in the guideway 9 and has only partly entered the housing 15 of the severing device 2. When the feed pusher 31 is moved to the right, the check rods 40, 41 will engage the molding 7. Being secured to the hollow cylinder 32, the guide plate 48 moves to the left with the feed pusher 31 so that the spring connection 47 between the guide plate 48 and the connecting plate 46 which connects the two check rods 40, 41 is eliminated. The feeler pin 50 is thus released to actuate a contact so as to stop the injection molding machine and the severing device. As a visual or audible signal is generated at the same time, the operator can remove the molding 7 from the guideway 9, which is open on one side for this purpose.

The safety device provided at the free ends of the handling and centering rods 11, 12 is apparent from FIG. 1. It consists of a feeler plate 51, which is centered with respect to the four handling and centering rods and guided in the mounting 13 and loaded by a spring 52. An actuating pin 53 is provided on the other side of the mounting 13. As soon as moldings 7 have been aligned on a handling and centering rod in such an amount that they engage the feeler plate 51, the actuating pin 53 actuates a limit switch 54 to stop the injection molding machine and the severing device and to generate an audible or visual signal. The handling and centering rods which have been filled to capacity are then fed to the welding machine or mounting machine and new handling and centering rods are inserted into the severing device 2. The automatically performed cycle of operations can now be initiated once more. The rods can be exchanged while the machine is in operation.

We claim:

1. Apparatus for the automatic separating and alignment of a plurality of frames which are connected together by a sprue and have been made on an injection molding machine, comprising a receiving hopper, a guide adjoining the receiving hopper and a separating and stacking device arranged at the end of the guide, the separating and stacking device comprising a housing having a plurality of detachably secured transport and centering bars mounted longitudinally therein with the transport bars being positioned behind the centering bars, a cutting knife and a transport pusher are positioned in the housing, the transport pusher being displaceable axially with respect to the transport and centering bars and with respect to the cutting knife, and provided with means to push the frames against the cutting knife and onto the transport and centering bars.

2. Apparatus according to claim 1, wherein the housing surrounds and guides the outside of the sprue-connected frames which are carried by the guide into the housing through an aperture in a wall of the housing, the sprue-connected frames rest in the housing and are bounded by the inner surface of the housing walls which serve to center the frames, the transport pusher and the cutting knife which is positioned opposite the transport pusher, the cutting knife being mounted between the centering bars.

3. Apparatus according to claim 2, wherein the centering bars cooperate with the housing to center the frames, said centering bars being arranged inside the housing and in a position corresponding to the distance between the two adjacent side edges of adjacent frames.

4. Apparatus according to claim 2, wherein the cutting knife is of substantially circular configuration and the transport pusher comprises a hollow cylinder having an inside diameter which is larger than the outside diameter of the cutting knife, said cylinder having an outlet opening in its body facing away from the cutting knife for discharge of the sprue when it has been cut from the frames.

5. Apparatus according to claim 4, wherein the transport pusher has a pressure plate mounted on its end facing the cutting knife, said pressure plate having a shape which substantially corresponds to the sprue-connected frames and having openings corresponding to the centering bars and to the cylindrical inside diameter of the transport bars.

6. Apparatus according to claim 2, wherein the centering bars are beveled in a direction towards the transport pusher and have pressing springs extending in their longitudinal direction, said springs preventing the frames from falling back into the housing when the frames are engaged by the transport pusher, causing the frames to be centered, cut off from the sprue, and stacked surrounding the transport and centering bars.